Oct. 20, 1964     R. G. MIHRAM ET AL     3,153,580
HIGH TEMPERATURE AND PRESSURE REACTOR
Filed April 28, 1960
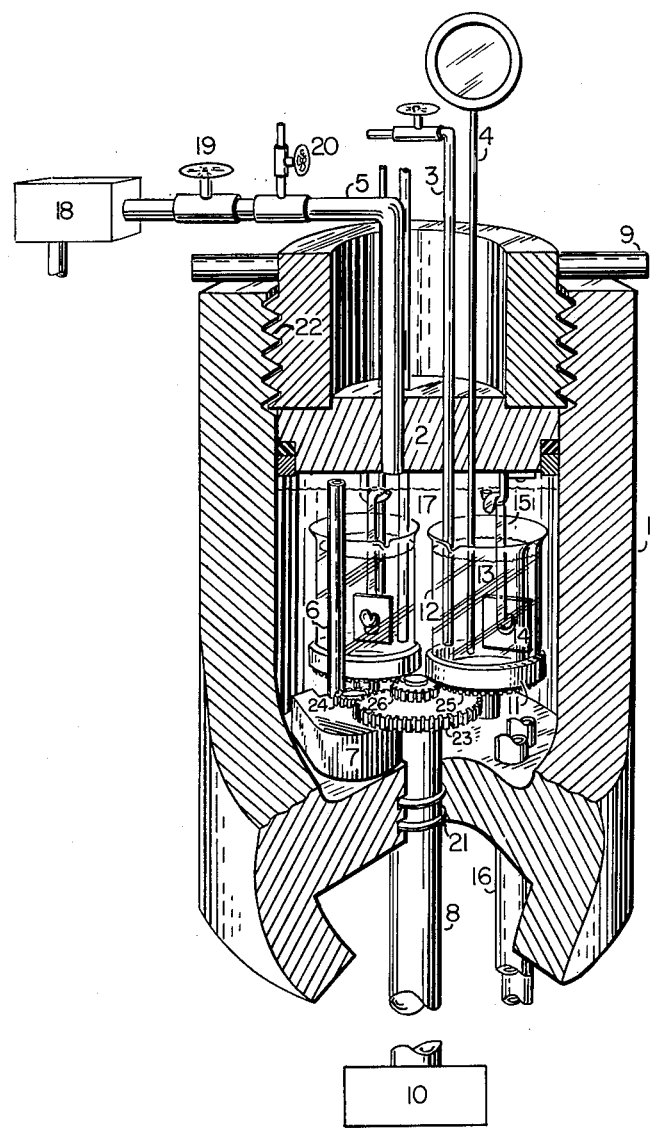
INVENTORS.
RUSSELL G. MIHRAM
WILLIAM A. GARDNER
BY Floyd Trimble
ATTORNEY 3,153,580
HIGH TEMPERATURE AND PRESSURE REACTOR
Russell G. Mihram and William A. Gardner, Duncan, Okla., assignors to Halliburton Company, a corporation of Delaware
Filed Apr. 28, 1960, Ser. No. 25,307
5 Claims. (Cl. 23—290)

This invention relates to a reaction vessel whereby a chemical reaction may be carried out under controlled conditions of temperature and pressure. More particularly, this invention relates to a reactor wherein the reactants can be quickly admixed when the desired conditions of temperature and pressure are attained. In another aspect of the invention, the reaction mixture can be quickly withdrawn from the reaction vessel as desired.

In chemical and related industries, research laboratories, and the like, pressure vessels are often required in which the reactions can be conducted and/or studied. In view of the high working pressures often utilized in carrying out such reactions, the equipment used has been heavy and cumbersome. Since the desired temperature conditions when using such equipment have been attained by circulating a heating or cooling fluid in the jacket of the reactor, which means the entire apparatus is heated or cooled, there has been a considerable time lag in either heating or cooling of the contents of such a vessel. Furthermore, in many instances the reacting materials are corrosive under the desired reaction conditions and for that reason the process can not be used safely in ordinary high pressure apparatus. In addition, many times the material of which the reactor is generally constructed exerts a catalytic effect upon the reactants. Attempts to overcome these difficulties, such as the use of glass lined equipment, have not been entirely satisfactory. On the other hand, materials which are corrosion-resistant and essentially non-catalytic are generally unsuitable for use in the construction of high pressure vessels on account of certain undesirable physical properties such as lack of tensile strength, brittleness and the tendency to "creep" on continued use at high temperatures. As a rule, therefore, high pressure reactions with corrosive chemicals are rarely attempted outside of small scale laboratory apparatus where small quantities of corrosive materials are reacted in glass or silica tubes. Even here, there is considerable hazard due to possible explosions which must be guarded against constantly and in the case of extremely high pressures the tubes or bombs must be very minute. Furthermore, when using pressure vessels heretofore available it has not been possible to control readily the starting or the stopping of the reaction.

It is, therefore, a principal object of the present invention to provide an apparatus suitable for use in carrying out a chemical reaction at abnormal conditions of temperature and pressure which obviates the disadvantages of the prior art apparatus. It is another object of this invention to provide an apparatus for a carrying out such reactions which is simple to construct and operate. It is another object of the present invention to provide an apparatus whereby the temperature of the reaction mixture may be quickly and accurately raised or lowered as desired. It is another object of this invention to provide an apparatus whereby the reaction can be quickly initiated and stopped when desired. These and other objects and advantages of the invention will become apparent as the description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Broadly stated, the invention pertains to an apparatus useful in carrying out a chemical reaction at an elevated temperature and/or pressure whereby the reaction is under control at all times. It comprises at least one reaction vessel rotatably mounted within a pressure chamber, means for heating the contents of the reaction vessel, and means for applying a pressure thereto. The heating means consist of an inert heat stable fluid as a heat conducting medium engulfing the reaction flask and filling completely the void space within the pressure chamber. The heat conducting medium is heated by heating coils. Air pressure or hydraulic means are employed to maintain the system under the desired pressure.

In the accompanying drawing the numeral 1 denotes the outer chamber, having an opening in the top which is closed by the plug 2. Obviously, if desired, the entire top of the outer chamber may be removable such as is used in the conventional method of constructing some autoclaves. Plug or cover 2 is provided with openings for the outlet tube or tubes 3, temperature indicator 4, which preferably is a temperature indicator and controller, and pressure control tube 5. The bottom of the pressure vessel is provided with an opening for the rotating shaft 8. Thorough mixing of the fluid 17, necessary for uniform heating, is accomplished by withdrawing the same from the top of chamber 1 through tube 6, through the pump 7, and injecting it into the base of the chamber. Obviously, agitation may be accomplished by reversing the flow. Other means may be utilized for mixing this fluid as will be apparent to those skilled in the art. As an alternative method, the circulating pump with tubes leading to it may be placed outside of the chamber 1. As another modification whereby agitation of the fluid may be accomplished consists in fitting paddles on the plate 11 or on the portion of shaft 8 which extends inside of chamber 1. A motor 10 provides the means for rotating shaft 8. Flask holder 11 provides a support for the reaction vessel 12. As illustrated, holder 11 is preferably provided with a rim or flange for holding the reaction flask, however, such is not mandatory. While the flask holder is illustrated as being in the form of a flat plate, it will be apparent that it may be in other forms. Furthermore, other means as will be obvious to those skilled in the art may be utilized for rotating the flask holder, including electrical, mechanical, or even magnetic means. The sample to be reacted with the reacting fluid 13 in the reaction vessel may be contained in a capsule if a liquid or a powder or, as illustrated, a metal coupon is denoted by the numeral 14 and is supported by hook 15. Heating coils 16, which may be either electrical or steam coils, are used for heating the fluid 17 which fills the void space in the pressure chamber.

In the preferred embodiment of the invention the pressure chamber is fitted with three rotatable flask holders set at 120° apart thus making it possible to run three examples simultaneously which, of course, must be conducted at the same temperature and pressure. Obviously, the three rotatable flask holders may be replaced with one flask holder attached directly to shaft 8 or, if desired, a greater number of flask holders than three may be used.

The fluid 17 used for conducting heat and pressure to the reaction mixture must be stable under the conditions used, non-corrosive, and have a specific gravity of less than that of any of the reactants or of the reaction mixture. In addition to the properties noted above, the viscosity of the fluid should be such that it can be circulated when cold regardless of the actual circulation means employed. Furthermore, it must be immiscible with all of the reactants and the reaction mixture. Examples of suitable fluids include various petroleum oil cuts such as kerosene, pale oil, bright stock and even oils of a lubricating grade. In addition to petroleum hydrocarbons synthetic oils may be used. Examples of the latter include, but are not limited thereto, aliphatic diesters (such as di-isooctyl azelate), silicate esters (such as hexa-2-ethyl butoxy disiloxane) and poly alkylene glycols or their ether derivatives. Dicarboxylic acid esters such as esters of adipic and azelaic acids with alcohols such as butyl, 2 ethyl hexyl and dodecyl alcohols. Other synthetic materials which may be used include cyclopentadienyltrihalosilanes, bis (cyclopentadienyl) iron, and the commercially available heat exchange liquids such as Dowtherm. Circulation of the fluid during the heating process insures uniform heating of the fluid.

The operation of the device is believed to be apparent from its description. One reactant is placed in the reaction flask 12 and the other reactant is placed in the capsule 14 and suspended on sample holder 15 after which chamber 1 is filled with the inert fluid.

Pressure control is attained by use of a pump which pumps the inert fluid into the chamber through inlet 5 operated in connection with a pressure control unit. For simplicity this is illustrated by means of valve 20, operated in conjunction with pressure and supply pump 18 and valve 19.

When the desired temperature and pressure conditions are reached, the capsule 14 containing the reaction sample can be crushed by suddenly increasing the pressure on the inert fluid. Thorough mixing of the reactants is accomplished by rotating the plate 11 which holds the reaction flask.

From the design of the apparatus it will be apparent that the reactants do not come in contact with anything except the reaction vessel 12, lower end of outlet tube 3, and the lower end of the temperature indicator and controller 4 and hook 15. Furthermore, within the chamber none of these items is subjected to any substantial pressure differential, they may be constructed of or enclosed in glass, Teflon or other inert material.

As one use of the apparatus, it has been found to be admirably suitable for the study of corrosion rates of well fluids upon steel. When so employed, either an actual or a synthetic sample of well fluids is placed in the reaction vessel 12 and a steel coupon 14 enclosed in capsule not shown is suspended on hook 15. When the desired temperature and pressure conditions are reached, the pressure is suddenly increased momentarily breaking the capsule thus exposing the coupon to the action of the well fluids. For tests such as the above, a light mineral oil of a lubricating grade is entirely satisfactory as the heating fluid.

While particular embodiments of the invention have been described, it will be understood, of course, that the invention is not limited thereto since many modifications may be made without departing from the spirit and scope of the invention. Thus, for example, both reactants may be liquids or one may be a liquid and the other a solid. Under some conditions it may be desirable to add one of the reactants which is a liquid to the other which may be a liquid or a solid when the desired conditions of temperature and pressure are attained. This may be accomplished by adding the liquid reactant to the reaction flask through the fluid outlet 3 by applying a pressure thereto which is greater than that within chamber 1. As another modification of the invention, it may be used for carrying out a chemical reaction as a continuous process. This is accomplished by reacting two fluids wherein the fluids are added to the reaction vessel through two separate inlets to the reaction vessel and the reaction mixture is withdrawn from the reaction vessel through a third tube leading from the reaction vessel out of the pressure chamber. It will be obvious that many other variations may be made in the exact design of the apparatus or in the procedural details without any detrimental effects.

It is, therefore, contemplated to cover by the appended claims any such modifications as fall within the true spirit and scope of the invention.

The invention having thus been described, what is claimed and desired to be secured by Letters Patent is:

1. In a reaction assembly adapted to contact a first reactant and a second reactant under controlled temperature and pressure conditions the combination comprising: a pressure chamber adapted to receive and contain a heat stable inert heat transfer fluid, a heat stable inert heat transfer fluid substantially filling said pressure chamber, an open top reaction vessel and a rotatable reaction vessel holder for holding said reaction vessel within said pressure chamber and submerged in said heat transfer fluid whereby said heat transfer fluid is in direct contact with the contents of said reaction vessel, means for rotating said reaction vessel holder, means for heating and agitating said heat transfer fluid for substantially uniform heating thereof, means for maintaining the desired pressure upon said inert heat transfer fluid, means for determining and controlling the temperature of the contents of said reaction vessel, means for mixing said reactants when the desired pressure and temperature conditions are reached, and means for withdrawing the reaction mixture from said reaction vessel.

2. An apparatus for conducting chemical reactions therein under controlled conditions of temperature and pressure, comprising: a pressure chamber adapted to receive and contain a heat stable inert heat transfer fluid; a heat stable inert heat transfer fluid substantially filling said pressure chamber; a plurality of open top reaction vessels; rotatable means for holding said reaction vessels within said pressure chamber and submerged in said heat transfer fluid; said heat transfer fluid being in direct contact with the contents of said reaction vessels; means for rotating said rotatable holding means; means for heating and agitating said heat transfer fluid for substantially uniform heating thereof; means for maintaining the desired pressure upon said inert heat transfer fluid, means for determining and controlling the temperature of the contents of said reaction vessel; means for mixing a reactant with a reactant in said reaction vessels when a desired pressure and temperature are reached; and, means for withdrawing the reaction mixture from said reaction vessels, whereby the reaction may be stopped when desired.

3. The apparatus of claim 2 wherein the means for heating the heat stable inert heat transfer fluid consists of a heat exchange coil extending through the bottom of the pressure chamber.

4. The apparatus of claim 2 wherein the means for maintaining the desired pressure upon the inert heat transfer fluid consists of a conduit connected to the discharge part of a pressure and supply pump and extending within the pressure chamber through the top thereof and the inlet part of said pump is connected to a supply of said heat transfer fluid.

5. The apparatus of claim 2 wherein the means for agitating the heat stable inert heat transfer fluid consists of a pump provided with an inlet and outlet mounted within and near the base of the pressure chamber and a conduit connected to and extending from said pump to a point near the top of said chamber whereby said heat transfer fluid may be caused to flow through said pump and conduit when said pump is rotated.

References Cited in the file of this patent

UNITED STATES PATENTS

| | | |
|---|---|---|
| 2,405,532 | Todd | Aug. 6, 1946 |
| 2,699,378 | Koelle | Jan. 11, 1955 |
| 2,793,941 | Estes | May 28, 1957 |
| 2,897,060 | Dieman | July 28, 1959 |
| 2,941,501 | Bell | June 21, 1960 |